United States Patent [19]

Willcox

[11] 4,182,810

[45] Jan. 8, 1980

[54] PREVENTION OF FOULING IN POLYMERIZATION REACTORS

[75] Inventor: Kenneth W. Willcox, Bartlesville, Okla.

[73] Assignee: Phillips Petroleum Company, Bartlesville, Okla.

[21] Appl. No.: 898,553

[22] Filed: Apr. 21, 1978

[51] Int. Cl.² .......................... C08F 2/14; C08F 4/78; C08F 10/00; C08F 10/02
[52] U.S. Cl. ........................................ 526/64; 526/74; 526/106; 526/201
[58] Field of Search .................... 526/64, 74, 106, 201

[56] References Cited

U.S. PATENT DOCUMENTS

| | | | |
|---|---|---|---|
| 2,908,671 | 10/1959 | Hochgraf et al. | 260/93.7 |
| 3,074,924 | 1/1963 | Kizer et al. | 260/95 |
| 3,248,179 | 4/1966 | Norwood | 23/285 |
| 3,330,818 | 7/1967 | Derby | 260/94.9 |
| 3,811,848 | 5/1974 | Johnson | 44/62 |
| 3,917,466 | 11/1975 | Henry, Jr. | 44/62 |
| 3,919,185 | 11/1975 | Takebe et al. | 260/93.7 |
| 3,956,252 | 5/1976 | Saeda et al. | 526/74 |
| 3,956,257 | 5/1976 | Hogan | 526/64 |
| 3,995,097 | 11/1976 | Brown et al. | 526/74 |
| 4,068,054 | 1/1978 | Willcox | 526/74 |

Primary Examiner—Alan Holler

[57] ABSTRACT

An olefin or mixture of olefins is polymerized in a hydrocarbon diluent in a turbulent reaction zone to produce particles of polymer which are substantially insoluble in the diluent (particle form process). Fouling of the reactor by adherence of polymer particles to the walls of the reactor is reduced by adding to the reaction medium a composition which comprises a mixture of (a) a polysulfone copolymer, (b) a polymeric polyamine, and (c) an oil-soluble sulfonic acid.

10 Claims, 1 Drawing Figure

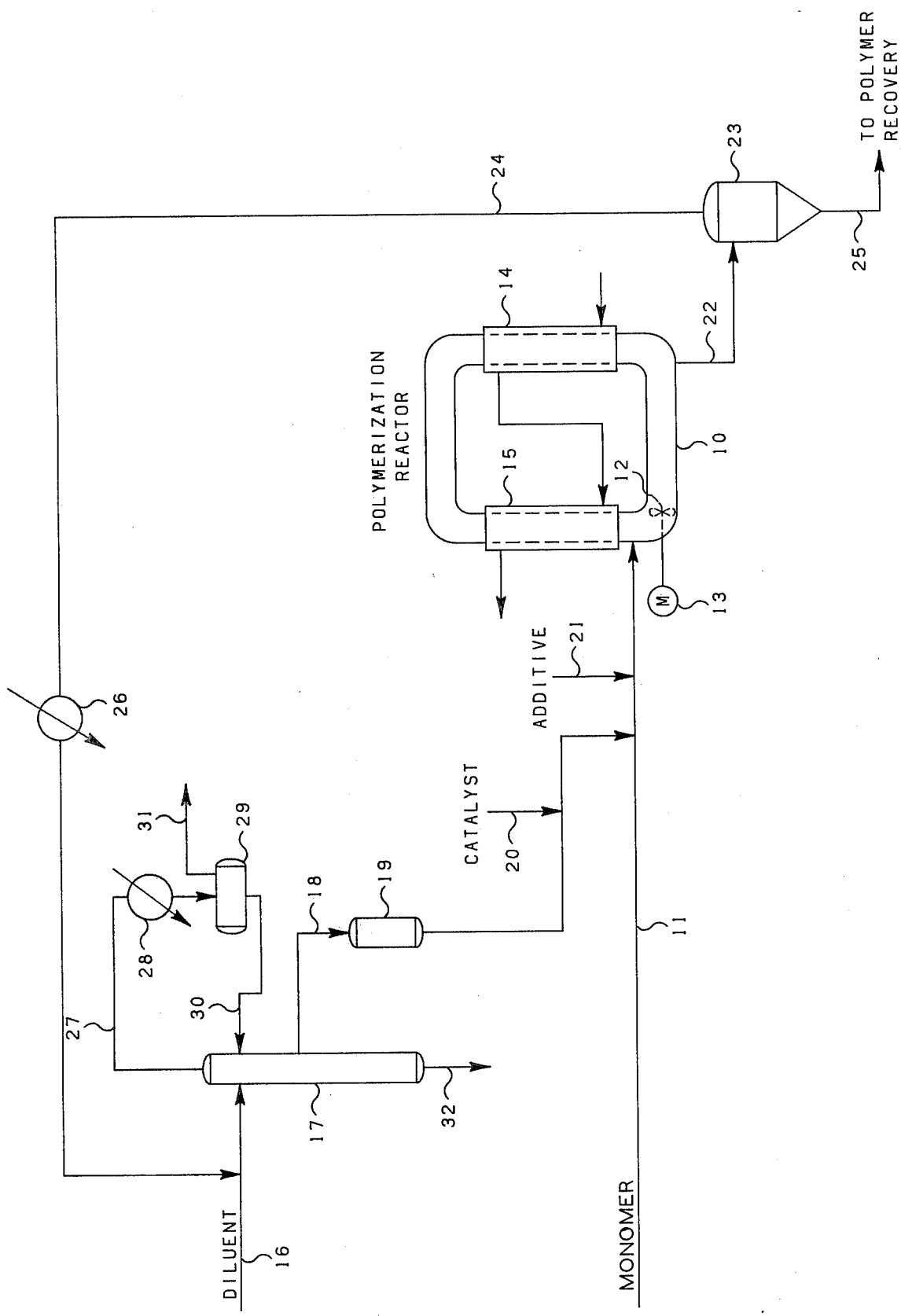

PREVENTION OF FOULING IN POLYMERIZATION REACTORS

BACKGROUND OF THE INVENTION

It is well known that normally solid polymers of olefins can be prepared by polymerizing the olefins in a hydrocarbon diluent in a turbulent reaction zone. Such processes are frequently carried out in such a manner as to produce particles of polymer which are substantially insoluble in the diluent. These processes are often referred to as "particle-form" polymerization processes. Such processes have certain economic advantages because it is not necessary to recover polymer from a solvent. This inherently simplifies the polymer recovery procedure. However, it has been found that the polymer particles often tend to adhere to the reactor walls to reduce heat transfer. This adherence of polymer particles may result in the reactor becoming plugged.

SUMMARY OF THE INVENTION

It is an object of this invention to reduce reactor fouling in a particle form polymerization process;

It is a further object to improve heat transfer in a particle form polymerization process; and It is yet a further object to provide an improved particle form polymerization process.

In accordance with this invention, it has been found that the problem of reactor fouling in a particle form process for polymerizing at least one olefin can be reduced or eliminated by addition to the reaction medium of a composition which comprises a mixture of (a) a polysulfone copolymer, (b) a polymeric polyamine, and (c) an oil-soluble sulfonic acid.

DESCRIPTION OF THE PREFERRED EMBODIMENTS

The accompanying drawing is a schematic representation of polymerization apparatus in which the method of this invention is particularly useful.

With reference to the drawing, olefin monomer to be polymerized is introduced into a loop reactor 10 through an inlet conduit 11. This reactor, which can be of the type described in detail in U.S. Pat. No. 3,248,179, is provided with an impeller 12 which is rotated by a motor 13. Impeller 12 serves to direct the reaction medium in a confined path through the loop reactor. The reactor is provided with jackets 14 and 15 through which a coolant can be circulated to remove heat.

Fresh diluent is introduced into the system as required through a conduit 16 which communicates with a fractionation column 17. This diluent, which can be isobutane, for example, is removed through a side stream withdrawal conduit 18 which has a dryer 19 therein. The dried diluent is added to the monomer stream introduced into reactor 10. Catalyst is added through a conduit 20, and the additive of this invention is added through a conduit 21. Polymer is withdrawn from reactor 10 through a conduit 22 which communicates with a flash tank 23. Diluent and unreacted monomer are removed from the top of flash tank 23 through a conduit 24. Polymer is removed from the bottom of flash tank 23 through a conduit 25 and passed to suitable recovery equipment.

The stream withdrawn through conduit 24 is passed through a cooler 26 and introduced into fractionation column 17. An overhead stream is withdrawn from the top of column 17 through a conduit 27 which has a condenser 28 therein. The resulting condensate is delivered to an accumulator 29, and from there is returned to column 17 as reflux through a conduit 30. Any light gases are removed through a conduit 31. Any heavy materials present are withdrawn from the bottom of column 17 through a conduit 32.

The method of this invention is applicable to the polymerization of olefins in a particle-form process wherein polymer particles are produced which are substantially insoluble in the diluent in the reactor. The invention is particularly applicable to the production of solid homopolymers of ethylene and copolymers of ethylene with another 1-olefin containing 3 to 8 carbon atoms per molecule. Exemplary copolymers include those of ethylene/propylene, ethylene/1-butene, ethylene/1-hexene and the like. Such copolymers generally comprise about 95 to 99 mol percent ethylene, and a small amount, i.e., 5 to 1 mol percent comonomer. As is known in the art, these polymers are particularly suited for extrusion, blow molding, injection molding and similar applications.

The foregoing polymers can advantageously be formed by use of a catalyst comprising calcined chromium compound associated with at least one of silica, alumina, zirconia, or thoria. Such catalysts are well known in the art and are described in U.S. Pat. Nos. 2,825,721, and 3,887,494, for example, the disclosures of which are herein incorporated by reference.

The polymers can also be produced by using a catalyst comprising at least one transition metal compound of Groups IV—VI of the Periodic Table, e.g., Ti, V, Cr, and the like, and an organometallic compound containing a metal from Groups I-III of the Periodic Table, e.g., sodium alkyl, Grignard reagent, trialkylaluminum, dialkylaluminum halide, etc. One such catalyst system, for example, comprises titanium tetrachloride supported on anhydrous magnesium chloride with a triethylaluminum cocatalyst. These catalyst systems are well known in the art and they are disclosed in U.S. Pat. Nos. 2,908,671; 3,919,185 and 3,888,835, for example.

The particle-form process to which this invention is applicable is a process in which at least one olefin is polymerized at a temperature in the range of about 150° to about 230° F. (65.6° to 110° C.). The catalyst is maintained in suspension and is contacted with the olefin feed in an organic diluent at pressure sufficient to maintain the medium and at least a portion of the olefin in the liquid phase. The reaction conditions are such that the polymer produced is substantially insoluble in the diluent and is recovered from the reactor in the form of solid particles. The diluent is generally a paraffin or a cycloparaffin having 3 to 12 carbon atoms per molecule. Representative examples of such diluents include propane, butane, isobutane, pentane, isopentane, cyclohexane, n-dodecane, methylcyclohexane, isooctane and the like. Pressures within the reaction zone can range from about 100 to 700 psig (6.8 to 47.6 atmospheres) or higher, and catalyst concentrations can range from about 0.001 to about 1 weight percent based on the weight of the reactor contents. Hydrogen can be added to modify the molecular weight of the polymers produced if desired. Processes of this type are disclosed in British Pat. No. 853,414, complete specification published Nov. 9, 1960, and in U.S. Pat. Nos. 3,644,323 and 3,995,097, the disclosures of which are herein incorporated by reference.

The reactor is one in which turbulence is imparted to the reaction medium. Reactors in the form of a loop in which the reaction medium is circulated are particularly useful. As previously mentioned, such a reactor is described in U.S. Pat. No. 3,248,179, the disclosure of which is herein incorporated by reference. However, other types of reactors, such as stirred reactors, can be employed.

In accordance with the instant invention, a suitable additive for preventing fouling during particle form polymerization of the aliphatic 1-olefin feed comprises 5–25 weight percent of a polysulfone copolymer, 5–25 weight percent of a polymeric polyamine, 5–30 weight percent oil-soluble sulfonic acid and 20–85 weight percent solvent. The same material used as the diluent in the polymerization reaction can be used as the solvent or the solvent can be different so long as it does not interfere with the polymerization reaction. Neglecting the solvent, the additive comprises about 5–70 weight percent polysulfone copolymer, 5–70 weight percent polymeric polyamine, and 5–70 weight percent oil-soluble sulfonic acid. The total of course being 100 percent, i.e., if one is 5 percent and one 70 the other would be 25. A suitable polysulfone copolymer is 1-decene polysulfone having an inherent viscosity (measured as a 0.5 weight percent solution in toluene at 30° C.) ranging from about 0.04 dl/g to 1.6 dl/g. A suitable polymeric polyamine is a 1:1.5 mol ratio reaction product of N-tallow-1,3-diaminopropane with epichlorohydrin. One such reaction product is "Polyflo 130" sold by Universal Oil Company. A suitable oil-soluble sulfonic acid is dodecylbenzenesulfonic acid. The solvents are selected from among benzene, toluene, xylene, cyclohexane, fuel oil, isobutane and mixtures thereof for instance. These components are described in some detail in U.S. Pat. No. 3,917,466.

The polysulfone copolymers often designated as olefin-sulfur dioxide copolymer, olefin polysulfones, or poly(olefin sulfone) are linear polymers wherein the structure is considered to be that of alternating copolymers of the olefins and sulfur dioxide, having a one-to-one molar ratio of the comonomers with the olefins in head to tail arrangement. The polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula—$(C_xH_{2x})$—COOH wherein x is from 0 to about 17, and B is hydrogen or carboxyl, with the proviso that when B is carboxyl, x is 0, and wherein A and B together can be a dicarboxylic anhydride group.

The polymeric polyamine is a polymeric reaction product of epichlorohydrin with an aliphatic primary monoamine or N-aliphatic hydrocarbyl alkylene diamine. The above-described reactions of epichlorohydrin with amines to form polymeric products are well known and find extensive use in epoxide resin technology.

Any oil-soluble sulfonic acid such as an alkanesulfonic acid or an alkarylsulfonic acid can be used. A useful sulfonic acid is petroleum sulfonic acid resulting from treating oils with sulfuric acid.

One useful composition, for example, consists of 13.3 weight percent 1:1 copolymer of 1-decene and sulfur dioxide having an inherent viscosity of 0.05 determined as above, 13.3 weight percent of "Polyflo 130" (1:1.5 mole ratio reaction product of N-tallow-1,3-diaminopropane with epichlorohydrin), 7.4 weight percent of dodecylbenzenesulfonic acid and 66 weight percent toluene.

The additive composition of this invention (including the solvent therefor) is added to the reactor in an amount ranging from about 0.01 to about 50 ppm, more preferably from about 0.1 to about 2 ppm, based on the weight of the diluent contained in the reactor. Based on just the polysulfone polymer, polymeric amine and oil-soluble sulfonic acid, the preferred concentration is about 0.003–15 preferably 0.03 to 1 parts by weight per million parts by weight of said diluent. This, of course, is the significant relationship since if the same material is used for the solvent for the additive as is used for the diluent for the polymerization, it would make no difference what proportion of this diluent was used as the solvent for the additive. The compositions can be added continuously or intermittently to the reactor. In a continuous polymerization process wherein effluent is being removed, it is presently preferred to continuously add a solution of the additive composition to the reactor along with make up diluent. Sufficient composition is added to maintain its concentration at the desired level in the reactor. In a batch process, a solution of the composition can be added at one time to obtain the desired concentration in the reactor.

EXAMPLE I

Polyethylene was produced in a particle form process in a loop reactor having a 6 inch (15.2 cm) diameter and a capacity of about 23 gallons (0.087 m$^3$). The polymerization catalyst, which was activated by calcining in air at 1500° F. (816° C.), comprised 2 weight percent chromium trioxide supported on catalytic grade particulate silica. Isobutane was employed as diluent. Typical reactor compositions under steady rate conditions reached consisted of 4.5 weight percent ethylene, 28 weight percent polymer and 67.5 weight percent diluent. The reactor was supplied with a cooling jacket to maintain its temperature at about 221° F. (105° C.). Hydrogen was admitted to the reactor to help control the molecular weight of each resulting polymer.

The additive composition of the invention runs was a material sold by DuPont under the trade name Stadis 450. This material consisted of 66 weight percent toluene, 13.3 weight percent of a 1:1 copolymer of 1-decene and sulfur dioxide having an inherent viscosity of 0.05, determined as a 0.5 weight percent solution in toluene at 30° C., 13.3 weight percent at a 1:1.5 mole ratio reaction product of N-tallow-1,3-diaminopropane with epichlorohydrin, and 7.4 weight percent of dodecylbenzenesulfonic acid.

The comparison additive composition employed is a commercially available material believed to be a 50 weight percent solution in hydrocarbon solvents of a mixture of chromium salts of mono- and dialkylsalicylic acids, calcium dodecylsulfosuccinate and a basic polymer.

The conditions used and results obtained are presented in the Table.

Table

Particle Form Polymerization of Ethylene

| Run No. | 1 | 2 | 3 | 4 |
|---|---|---|---|---|
| Hydrogen, Mol Percent | 0.46 | 0.48 | 0.47 | 0.48 |
| Additive Used Type | Invention | Comparison | Invention | — |
| Concentration, ppm.[1] | 0.5 | 0.5 | 0.25 | None |
| ΔT, °F. (°C.) | 12.7 (7.1) | 10.8 (6.0) | 11.8 (6.6) | 17.0 (9.5) |
| Polymer Properties |  |  |  |  |
| Melt Index, g/10 min.[2] | 0.73 | 0.73 | 0.71 | 0.71 |
| Density g/cc | 0.963 | 0.963 | 0.963 | 0.963 |
| Productivity lbs. Polymer/Lb. Catalyst | 3900 | 3700 | 3900 | 4000 |

[1] Includes 66 percent solvent in invention and 50 percent solvent in comparison:
[2] Melt index as determined in accordance with ASTM D 1238 (190° C., 2160 g weight).

The runs shown in the Table are all made under similar polymerization conditions and productivities are approximately the same. Thus, a valid comparison can be made among them since the heat load in the reactor is similar in each run. Invention runs 1 and 3 and comparison run 2 show that polyethylene is produced with no fouling tendencies in the particle form process in the presence of each additive composition. The ΔT values shown are in a range where no fouling occurs. The invention additive composition has only a slight effect on productivity, e.g. 3900 lbs. polymer per lb. catalyst compared to 4000 for the control run with no additive present (2.5 percent decrease). The comparison additive composition, however, causes a decrease in productivity to 3700 lbs polymer per lb. catalyst (7.5 percent decrease).

Under the conditions employed, when ΔT reaches about 16°–17° F. (8.9°–9.5° C.) fouling can be expected to occur. In control run 4, when ΔT reached 17° F. and fouling was starting to appear, sufficient invention additive composition was added to reactor to obtain a level of 0.25 ppm based on the isobutane content. The ΔT started to drop and stabilized 5½ hours later at 12.6° F. (7.0° C.). Fouling was stopped by the addition of the invention composition and the process performed in a satisfactory manner.

The foregoing runs demonstrate the effectiveness of the additive of this invention.

EXAMPLE II

The Stadis 450 composition described in Example I was used in a commercial scale loop reactor in the particle form production of an ethylene/hexene-1 copolymer using isobutane as the diluent. The Stadis 450 solution (i.e. 66 percent toluene and 34 percent of the active ingredients) was diluted with a portion of the hexene-1 monomer to give a 4½ percent solution of the Stadis 450 composition, i.e., about 1½ percent active ingredients. This was added to recycle isobutane in an amount sufficient to give 0.5 parts of the Stadis 450 composition (66 percent solvent) per million parts of recycle isobutane. This was increased temporarily to 1 ppm when the ΔT rose. The actual concentration in the reactor is believed to be similar to the 0.25 ppm based on total isobutane diluent used in pilot plant scale work which was increased to 0.5 ppm temporarily when the ΔT rose. Nitrogen pressure was used to meter the Stadis 450 solution through an orifice into the recycle isobutane stream.

While this invention has been described in conjunction with presently preferred embodiments, it is not limited thereto but is intended to cover all changes and modifications within the spirit and scope thereof.

I claim:

1. In a process in which at least one olefin is polymerized in a hydrocarbon diluent in a turbulent reaction zone to produce particles of polymer which are substantially insoluble in the diluent, the method of reducing adherence of polymer particles to the walls of the reaction zone which comprises adding to the reaction medium in an amount effective to reduce adherence of polymer particles to the walls a composition comprising
   (a) a polysulfone copolymer of sulfur dioxide and an olefinic compound;
   (b) a polymeric polyamine which is a reaction product of epichlorohydrin with an aliphatic primary monoamine or N-aliphatic hydrocarbyl alkylene diamine; and
   (c) an oil-soluble sulfonic acid.

2. The method of claim 1 wherein said composition comprises 5–70 weight percent of (a) 5–70 weight percent of (b) and 5–70 weight percent of (c), the total being 100 weight percent, and is added to the reaction medium in the range of about 0.03 to 1 parts by weight per million parts by weight of said diluent.

3. The method of claim 1 wherein said polysulfone copolymer is 1-decene polysulfone having an inherent viscosity within the range of 0.04 to 1.6 dl/g, said polymeric polyamine is a 1:1.5 mol ratio reaction product of N-tallow-1,3-diaminopropane with epichlorohydrin, and said oil-soluble sulfonic acid is dodecyclbenzenesulfonic acid.

4. A method according to claim 1 wherein said turbulent reaction zone is a loop reactor.

5. A method according to claim 1 wherein said composition comprises in addition a solvent selected from benzene, toluene, zylene, cyclohexane, fuel oil, isobutane, and mixtures thereof.

6. A method according to claim 5 wherein said composition comprises: 13.3 weight percent of a copolymer of 1-decene and sulfur dioxide having an inherent viscosity of 0.05; 13.3 weight percent of a 1:1.5 mole ratio reaction product of N-tallow-1,3-diaminopropane, with epichlorohydrin; 7.4 weight percent dodecylbenzenesulfonic acid; and 66 weight percent toluene.

7. A method according to claim 6 wherein said olefin is ethylene.

8. A method according to claim 7 wherein said turbulent reaction zone is a loop reactor.

9. A method according to claim 8 wherein said diluent is isobutane and said polymerization is carried out using a catalyst comprising a silica support containing a chromium compound which has been calcined.

10. A method according to claim 9 wherein said composition is used in an amount within the range of 0.1 to 2 ppm and wherein there is present in addition a small amount of hexene-1 comonomer.

* * * * *